United States Patent
Tulino (10) Patent No.: US 9,137,818 B2
(45) Date of Patent: Sep. 15, 2015

(54) METHOD AND SYSTEM FOR A REDUCED-COMPLEXITY SCHEDULING FOR A NETWORK MIMO WITH LINEAR ZERO-FORCING BEAMFORMING

(71) Applicant: Alcatel-Lucent USA Inc., Murray Hill, NJ (US)

(72) Inventor: Antonia Tulino, Lincroft, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 180 days.

(21) Appl. No.: 13/647,524

(22) Filed: Oct. 9, 2012

(65) Prior Publication Data

US 2013/0155970 A1    Jun. 20, 2013

Related U.S. Application Data

(60) Provisional application No. 61/570,498, filed on Dec. 14, 2011.

(51) Int. Cl.
| H04W 4/00 | (2009.01) |
| H04W 72/12 | (2009.01) |
| H04B 7/04 | (2006.01) |
| H04B 7/02 | (2006.01) |

(52) U.S. Cl.
CPC ......... H04W 72/1273 (2013.01); H04B 7/0452 (2013.01); H04B 7/024 (2013.01)

(58) Field of Classification Search
USPC ......... 370/203, 204–215, 229–240, 310–337, 370/338–350, 351–394, 395.1, 395.3, 370/395.4, 395.41, 395.42, 395.5, 395.52, 370/431–457, 458–463, 464–497, 498–529
See application file for complete search history.

(56) References Cited

U.S. PATENT DOCUMENTS

| 8,705,484 B2* | 4/2014 | Caire et al. ..................... 370/330 |
| 2009/0154419 A1* | 6/2009 | Yoshida et al. ............... 370/330 |
| 2010/0034151 A1* | 2/2010 | Alexiou et al. ............... 370/329 |
| 2011/0150114 A1* | 6/2011 | Miao et al. ..................... 375/260 |
| 2013/0182789 A1* | 7/2013 | Ko et al. ........................ 375/267 |
| 2013/0242896 A1* | 9/2013 | Son et al. ....................... 370/329 |
| 2013/0259156 A1* | 10/2013 | Baligh et al. ................. 375/296 |
| 2013/0315156 A1* | 11/2013 | Xiao et al. ..................... 370/329 |
| 2014/0003272 A1* | 1/2014 | Benjebbour et al. .......... 370/252 |

(Continued)

OTHER PUBLICATIONS

Boccardi, F. and Huang, H. Limited downlink network coordination in cellular networks. *Proc. IEEE Int. Symp. on Personal, Indoor and Mobile Radio Commun.* (*PIMRC*), Athens, Greece, 2007.

(Continued)

*Primary Examiner* — Jung-Jen Liu
(74) *Attorney, Agent, or Firm* — Harness, Dickey & Pierce, P.L.C.

(57) ABSTRACT

Example embodiments are directed toward a system and a method for downlink scheduling in a multi-user, multiple-input and multiple-output (MU-MIMO) network with a central controller employing a scheduling scheme pre-selecting user equipment according to probabilities obtained from a large-system analysis. Only pre-selected user equipment is requested to feedback channel state information, thereby reducing cluster interference and increasing throughput while greatly reducing the required feedback channel state information generally required to schedule transmissions.

18 Claims, 6 Drawing Sheets

(56) References Cited

U.S. PATENT DOCUMENTS

2014/0016499 A1* 1/2014 Forenza et al. .............. 370/252
2014/0093005 A1* 4/2014 Xia et al. ..................... 375/267

OTHER PUBLICATIONS

Boudreau, G. and Panicker, J. and Ning Guo and Rui Chang and Neng Wang and Vrzic, S. Interference coordination and cancellation for 4G networks. *IEEE Communications Magazine*, 47(4):74-81, 2009.

Caire, G. and Ramprashad, S.A. and Papadopoulos, H.C. and Pepin, C. and Sundberg, C.E.W. Multiuser MIMO downlink with limited inter-cell cooperation: approximate interference alignment in time, frequency and space. *Proc. Allerton Conf. on Commun., Control, and Computing*, Urbana-Champaign, IL, 2008.

Caire, G. and Shamai (Shitz), S. On the achievable throughput of a multiantenna Gaussian broadcast channel. *IEEE Trans. on Inform. Theory*, 49:1691-1706, 2003.

H. Dahrouj and W. Yu. Coordinated beamforming for the multicell, multi-antenna wireless system. *IEEE Trans. on Wireless Commun.*, 9(5):1748-1759, 2010.

G. Dimic and N. Sidiropoulos. On downlink beamforming with greedy user selection: Performance analysis and simple new algorithm. *IEEE Trans. on Sig. Proc.*, 53:3857-3868, 2005.

Farajidana, A. and Wanshi Chen and Damnjanovic, A. and Taesang Yoo and Malladi, D. and Lott, C. 3GPP LTE Downlink System Performance. *Proc. IEEE Global Commun. Conf. (GLOBECOM)*, Honolulu, HI, 2009.

G. Foschini and K. Karakayali and R. A. Valenzuela. Coordinating multiple antenna cellular networks to achieve enormous spectral efficiency. *IEE Proc. Commun.*, 152:548-555, 2006.

3GPP technical specification group radio access network. Further advancements for E-UTRA: LTE-Advanced feasibility studies in RAN WG4. Technical report, 3GPP TR 36.815, 2010.

Hochwald, B.M. and Marzetta, T.L. and Tarokh, V. Multiple-antenna channel hardening and its implications for rate feedback and scheduling. *Information Theory, IEEE Transactions on*, 50(9): 1893-1909, 2004.

Hoon Huh and Haralabos C. Papadopoulos and Giuseppe Caire. MIMO broadcast channel optimization under general linear constraints. *Proc. IEEE Int. Symp. on Inform. Theory (ISIT)*, Seoul, Korea, 2009.

Hoon Huh and Haralabos C. Papadopoulos and Giuseppe Caire. Multiuser MISO Transmitter Optimization for Intercell Interference Mitigation. *IEEE Trans. on Sig. Proc.*, 58(8):4272-4285, 2010.

IEEE 802.16 broadband wireless access working group. IEEE 802.16m system requirements. Technical report, IEEE 802.16m-07/002, 2010.

Sheng Jing and David N. C. Tse and Joseph B. Soriaga and Jilei Hou and John E. Smee and Roberto Padovani. Downlink Macro-Diversity in Cellular Networks. *Proc. IEEE Int. Symp. on Inform. Theory (ISIT)*, Nice, France, 2007.

Landre, Jean-Baptiste and Saadani, Ahmed and Ortolan, Francois. Realistic performance of HSDPA MIMO in macro-cell environment. *Proc. IEEE Int. Symp. on Personal, Indoor and Mobile Radio Commun. (PIMRC)*, Tokyo, Japan, 2009.

Parkvall, S. and Dahlman, E. and Furuskar, A. and Jading, Y. and Olsson, M. and Wanstedt, S. and Zangi, K. LTE-Advanced—Evolving LTE towards IMT-Advanced. *Proc. IEEE Vehic. Tech. Conf. (VTC)*, Calgary, Alberta, 2008.

Alessandro Tomasoni and Giuseppe Caire and Marco Ferrari and Sandro Bellini. On the selection of semi-orthogonal users for zero-forcing beamforming. *Proc. IEEE Int. Symp. on Inform. Theory (ISIT)*, Seoul, Korea, 2009.

Antonia M. Tulino and Angel Lozano and Sergio Verdu. Impact of antenna correlation on the capacity of multiantenna channels. *IEEE Trans. on Inform. Theory*, 7:2491-2509, 2005.

Antonia M. Tulino and Sergio Verdu. *Random Matrix Theory and Wireless Communications*, vol. 1. Foundations and Trends in Communications and Information Theory, 2004.

Vishwanath, S. and Jindal, N. and Goldsmith, A. Duality, achievable rates, and sum-rate capacity of Gaussian MIMO broadcast channels. *IEEE Trans. on Inform. Theory*, 49:2658-2668, 2003.

Viswanath, P. and Tse, D. Sum capacity of the vector Gaussian broadcast channel and uplink-downlink duality. *IEEE Trans. on Inform. Theory*, 49:1912-1921, 2003.

P. Viswanath and D. Tse and R. Laroia. Opportunistic beamforming using dumb antennas. *IEEE Trans. on Inform. Theory*, 48:1277-1294, 2002.

Weingarten, H. and Steinberg, Y. and Shamai (Shitz), S. The capacity region of the Gaussian multiple-input multiple-output broadcast channel. *IEEE Trans. on Inform. Theory*, 52:3936-3964, 2006.

Wiesel, A. and Eldar, Y.C. and Shamai (Shitz), S. Zero-forcing precoding and generalized inverses. *IEEE Trans. on Sig. Proc.*, 56:4409-4418, 2008.

T. Yoo and A. Goldsmith. On the optimality of multiantenna broadcast scheduling using zero-forcing beamforming. *IEEE J. Select. Areas Commun.*, 24:528-541, 2006.

Yu, W. and Cioffi, J.M. Sum capacity of Gaussian vector broadcast channels. *IEEE Trans. on Inform. Theory*, 50:1875-1892, 2004.

R. Zhang. Cooperative multi-cell block diagonalization with per-base-station power constraints. submitted to *IEEE J. Select. Areas Commun.*, 2009.

* cited by examiner

FIG. 1 (Conventional)

FIG. 2 (Conventional)

FIG. 3 (Conventional)

FIG. 5

FIG. 6 pre-selecting the subset of user equipments from each co-located user group generate $\gamma BN$ i.i.d. random variables $S_1(t), \ldots, S_{\gamma BN}(t)$ taking values on the integers $\{0, 1, \ldots, A\}$ with probability $$P(S_i(t) = k) = \frac{\mu_k}{\gamma B} \quad k \neq 0$$

and $$P(S_i(t) = 0) = 1 - \sum_{k=1}^{A} \frac{\mu_k}{\gamma B} \quad k = 0$$

s431

$S_1(t), \ldots, S_{\gamma BN}(t)$

For each $i \in \{1, \ldots, \gamma NB\}$

A user randomly chosen in group $S_i(t) \in \{1, \ldots, A\}$ is selected to be scheduled by stream i making sure that different streams serve distinct users.

s432

METHOD AND SYSTEM FOR A REDUCED-COMPLEXITY SCHEDULING FOR A NETWORK MIMO WITH LINEAR ZERO-FORCING BEAMFORMING

PRIORITY STATEMENT

This application claims priority under 35 U.S.C. §120 to U.S. provisional app. No. 61/570,498 filed on Dec. 14, 2011, the contents of which is incorporated by reference in its entirety.

BACKGROUND OF THE INVENTION

1. Field of the Invention

Example embodiments relate generally to downlink scheduling of users in a multi-user, multiple-input and multiple-output (MU-MIMO) system. Pre-selection of a subset of users, for purposes of the scheduling, may be accomplished without first obtaining channel state information for each of the users.

2. Related Art

The next generation of wireless communication systems (e.g., 802.16m, LTE-Advanced, etc.) use multi-user MIMO (MU-MIMO) as a core technology. A considerable research effort has been dedicated to the performance evaluation of MU-MIMO systems under realistic cellular environments. In a MU-MIMO system, Inter-Cell Interference (ICI) may be treated as noise which may significantly limit system capacity. Using a network MIMO approach, clusters of cooperating base stations (BSs) act as a single distributed MIMO transmitter and interference from other clusters of BSs is treated as noise. Each cluster seeks to maximize its own objective function defined by fairness scheduling.

Figure 1:
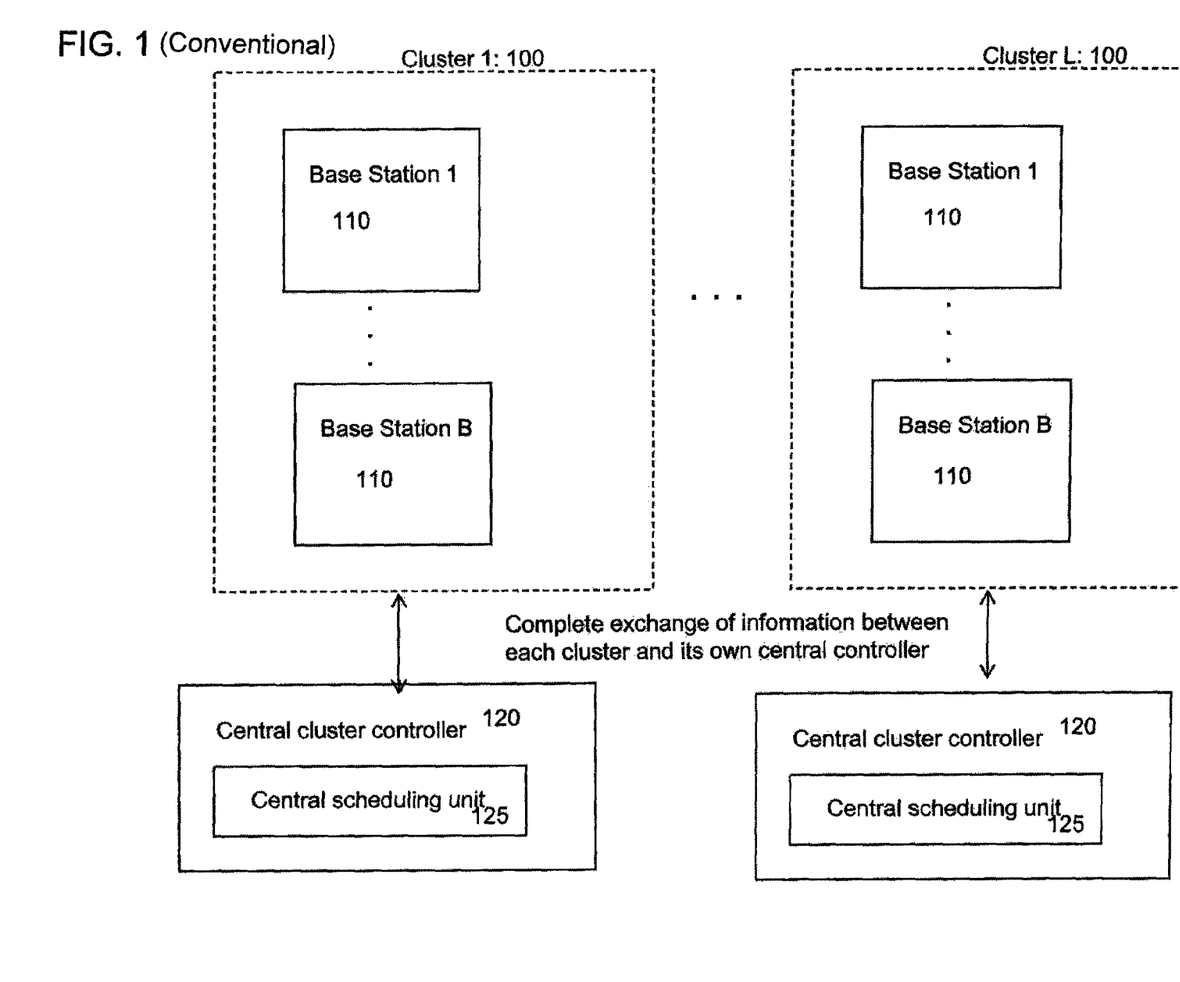
FIG. 1 is a simplified diagram of conventional clusters of base stations.

FIG. 1 is a simplified diagram of conventional clusters of base stations 110 (see clusters 1 through L). Specifically, each cluster may include a number of base stations 110, numbered 1 through B. Each cluster may include a central cluster controller 120 with a central scheduling unit 125. The central scheduling unit 125 may be instrumental in ensuring that the base stations 1-B of each cluster "cooperate," from the standpoint that each cluster of base stations 1-B act as a single distributed MIMO transmitter that seeks to maximize its own objective function (which may maximize transmitter output while reducing interference from other clusters).

Figure 2:
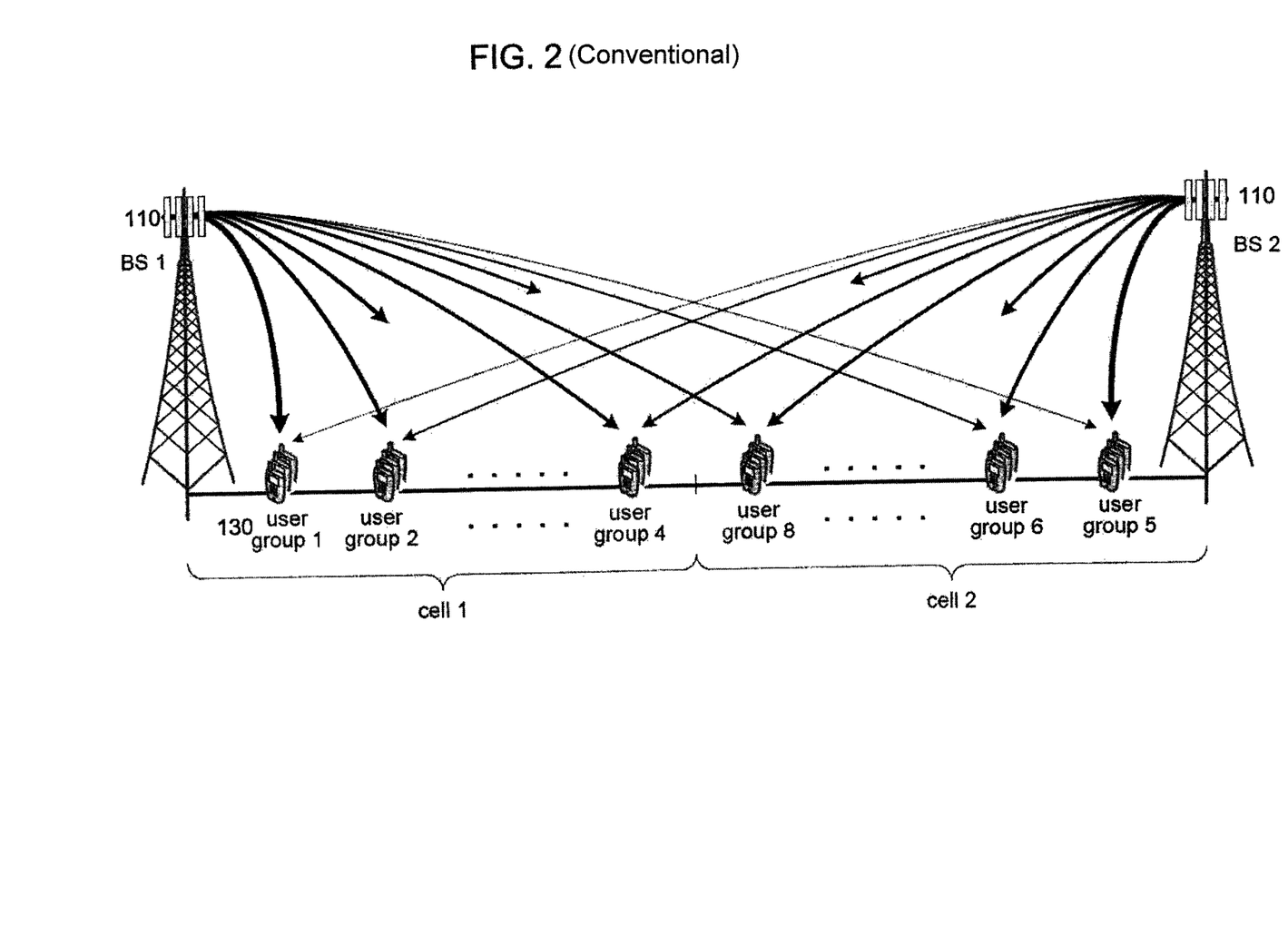
FIG. 2 is an exemplary diagram of a single conventional cluster of base stations.

FIG. 2 is an exemplary diagram of a single conventional cluster of base stations 110. Specifically, FIG. 2 includes a cluster with two base stations 110 (BS1, and B52), though more than two base stations 100 may be included per cluster. In this example, both base stations 110 serve two cells (cell 1, and cell 2), though other clusters may include different numbers of cells. Within each cluster there may be K collocated user groups (for instance, as shown in FIG. 2, we assume that user groups 1-4 belong to cell 1 of the cluster, and groups 5-8 belong to cell 2 of the cluster). The users in the same group are "collocated," from the standpoint that the users experience the same path loss (and, have the same path loss coefficients) from the base station while their small scale fading channel coefficients are independent and identically distributed (i.i.d), as the user equipment included within the group is in a similar physical location.

Figure 3:
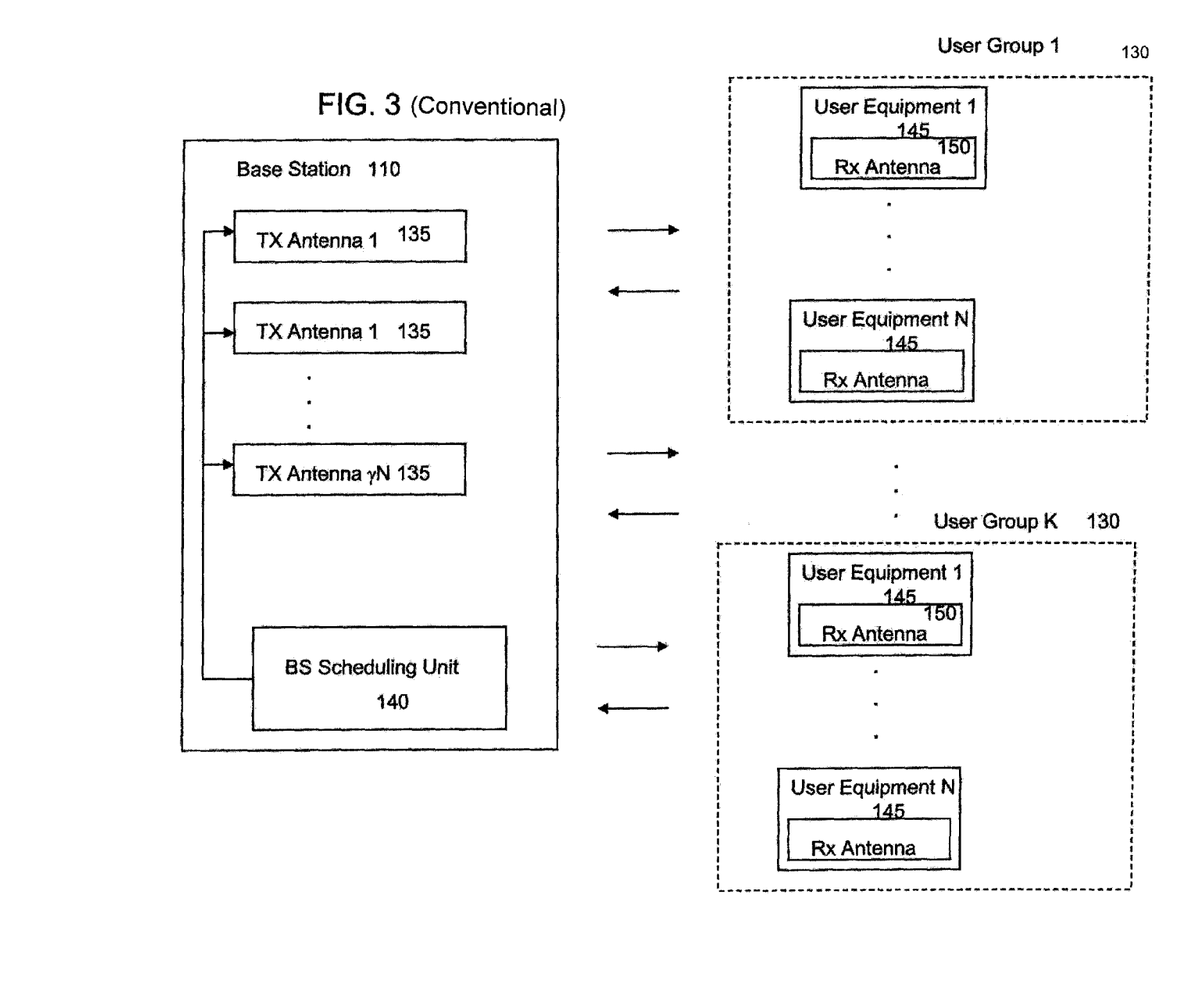
FIG. 3 is a simplified diagram of a conventional base station including multiple antennas.

FIG. 3 is a simplified diagram of a conventional base station 110 including multiple antennas 135 (antenna 1 through antenna $\gamma N$). Transmissions from the multiple antennas 135 may be accomplished via a base station scheduling unit 140. The base station 110 may transmit to K user groups 130, each user group potentially including multiple user equipment 145 (1-N), and each user equipment including an antenna 150. At any instance of time, each antenna 145 may transmit to only a single user equipment 145, creating a limit in transmission capacity for the cluster.

Based on the general understanding of FIGS. 1-3, as described above, a more mathematical description of the system of FIGS. 1-3 in now included herein. At the outset, it should be understood that user in a same group 130 (as shown in FIGS. 2-3) are statistically equivalent. In other words, they see the same pathloss coefficients from all BSs, and their small-scale fading channel coefficients are independently and identically distributed. The received signal vector $y_k = [y_{k,1} \ldots y_{k,N}]^T \in C^N$ for the k-th user group is given by:

$$y_k = \sum_{m=1}^{M} \alpha_{m,k} H_{m,k}^H x_m + n_k \qquad (1)$$

Symbols $\alpha_{mk}$ and $H_{m,k}$ may denote the distance dependent pathloss coefficient and $\gamma N \times N$ small-scale channel fading matrix from the m-th BS to the k-th user group, respectively, $x_m = [x_{m,1} \ldots x_{m,\gamma N}]^T \in C^{\gamma N}$ is the transmitted signal vector of the m-th BS, subject to the power constraint $tr(Cov(x_m)) \leq P_m$, and $n_k = [n_{k,1} \ldots n_{k,N}]^T \in C^N$ denotes the additive white Gaussian noise (AWGN) at the user receivers. The elements of $n_k$ and of $H_{m,k}$ are independently and identically distributed.

A cooperative cell arrangement with L cooperation clusters is defined by the BS partition $\{M_1, \ldots, M_L\}$ of the BS set $\{1, \ldots, M\}$ and the corresponding user group partition $\{K_1, \ldots, K_L\}$ of the user group set $\{1, \ldots, K\}$. It is assumed that the BSs 110 in each cluster $M_l$ act as a single distributed multi-antenna transmitter with $\gamma |M_l| N$ antennas, perfectly coordinated by a central cluster controller, and serving users in groups $k \in K_l$. The clusters do not cooperate, as each cluster treats ICI from other clusters as noise. Assuming that each BS operates at its maximum individual transmit power, the ICI plus noise power at any user terminal in group $k \in K_l$ is given by:

$$\sigma_k^2 = 1 + \sum_{m \notin M_l} \alpha_{m,k}^2 P_m. \qquad (2)$$

Each cluster seeks to maximize its own objective function defined by fairness scheduling. Under the above system assumptions, a selfish optimal strategy that operates at maximum per-BS power is a Nash equilibrium of the system. At this Nash equilibrium, the clusters are effectively decoupled since the effect that other clusters have on each cluster l is captured by the ICI terms in (2) that do not depend on the actual BS transmit covariances $Cov(x_m)$.

From the viewpoint of cluster l, the system is equivalent to a single-cell MIMO downlink channel with a modified channel matrix and noise levels and a per-BS power constraint. Therefore, for a given reference cluster l=1, the user groups in the reference cluster may be indicated as $k=1, \ldots, A$, with $A=|K_1|$, and the BSs in $M_1$ as $m=1, \ldots, B$ with $B=|M_1|$. After a convenient re-normalization of the channel coefficients, we arrive at the equivalent channel model for the reference cluster given by:

$$y = H^H x + z \qquad (3)$$

with $y \in C^{AN}$, $x \in C^{\gamma BN}$, $z \sim CN(0, I_{AN})$ and the channel matrix $H \in C^{\gamma BN \times AN}$ is given by $$H = \begin{bmatrix} \beta_{1,1}H_{1,1} & \cdots & \beta_{1,A}H_{1,A} \\ \vdots & & \vdots \\ \beta_{B,1}H_{B,1} & \cdots & \beta_{B,A}H_{B,A} \end{bmatrix}, \quad (4)$$

where we define $\beta_{m,k} = \alpha_{m,k}/\sigma_k$

The pathloss coefficients are fixed constants that depend only on the geometry of the system. The small-scale fading coefficients are assumed to change independently from time slot to time slot according to a classical block-fading model (noting that a "time slot" indicates a number of channel uses over which the small-scale coefficients can be considered constant, which is approximately equal to the product of channel coherence time and the channel coherence bandwidth). This is representative of a typical scenario where the distance between BSs and users changes significantly over a time-scale of the order of the tens of seconds (due to movement of the users), while the small-scale fading decorrelates completely within a few milliseconds.

Referring to FIG. 1, the cluster controller 120 including a central controller 120 that operates according to a downlink scheduling scheme that allocates instantaneously the transmission resource (signal dimensions and transmit power) to the users. To accomplish this, we focus on the weighted instantaneous sum-rate maximization problem:

$$\text{maximize} \sum_{k=1}^{A} \sum_{i=1}^{N} W_k^{(i)} R_k^{(i)} \quad (5)$$

$$\text{subject to } R \in R_{lzfb}(H)$$

Symbol $W_k^{(i)}$ denotes the rate weight for user i in group k, and $R_{lzfb}(H)$ is the achievable "instantaneous" rate region of Linear Zero-Forcing Beamforming (LZFB) for given channel matrix H. It should be understood that "instantaneous" means that this rate region depends on the given channel realization H, in contrast with the throughput region $\overline{R}$, that depends on the statistics of H. It is assumed that A≥γB (i.e., with reference to FIG. 3, the number of users 145 in the cluster is larger than the total number of base station antennas 135 in the cluster) and that all coefficients $\beta_{m,k}$ are strictly positive. Therefore, rank(H)=γBN is satisfied. In this case, LZFB cannot serve simultaneously all users in the cluster, and the scheduler must select a subset of users not larger than γBN, to be served at each time slot. The solution of (5) is generally difficult, since it requires: 1) a search over all user subsets of cardinality less or equal to γBN, and 2) either a full or a large amount of CSIT (Channel State Information at the Transmitter) feedback since it needs CSIT reports from many (or, all) users in order to select a subset of users at each scheduling slot, even though no more users than the number of antennas can be served at a time.

Based on the discussion of FIGS. 1-3 (described above), and an understanding that users in the system may be in constant movement, conventional cluster controllers 120 have often been designed to obtain CSIT for each user equipment 145 served by the cluster, prior to selecting subsets of users for scheduling transmissions. CSIT characterizes the state of all links between each base station 110 and the respective user equipment 145 of the cluster. Specifically, CSIT may include both large-scale fading coefficient (i.e., path-loss coefficients), which are constant across collocated users, and small-scale fading coefficients (i.e., Rayleigh fading coefficients), which possess time-variations that are much faster than the path-loss and change within collocated user groups (it should be understood that the number of small-scale fading coefficients is equal to the number of receiving and transmitting antennas at the base station). By first obtaining CSIT, the central scheduling unit 125 of the cluster may select subsets of approximately orthogonal users (with cardinality not larger than the number of jointly coordinated transmit antenna) for transmission at a same frequency and time. However, for systems with a large number of users per cluster, the cost of first obtaining CSIT feedback for all user equipment (prior to selecting subsets of users) becomes prohibitive.

SUMMARY OF INVENTION

Example embodiments provide a method and system for pre-selecting subsets of users in a MU-MIMO system, using a probabilistic scheduling algorithm where only the pre-selected users are required to provide CSIT feedback. The example embodiments may be used to reduce cluster interference and increase throughput, while greatly reducing the required CSIT feedback for scheduling transmissions.

BRIEF DESCRIPTION OF THE DRAWINGS

The above and other features and advantages of example embodiments will become more apparent by describing in detail, example embodiments with reference to the attached drawings. The accompanying drawings are intended to depict example embodiments and should not be interpreted to limit the intended scope of the claims. The accompanying drawings are not to be considered as drawn to scale unless explicitly noted.

DETAILED DESCRIPTION

Detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes including routines, programs, objects, components, data structures, etc., that perform particular tasks or implement particular abstract data types and may be implemented using existing hardware at existing network elements (e.g., small cells, small cell gateways, small wireless access points, Femto access points, macro base stations, mobile switching centers, mobile stations, etc.). Such existing hardware may include one or more Central Processing Units (CPUs), digital signal processors (DSPs), application-specific-integrated-circuits, field programmable gate arrays (FPGAs) computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium," "storage unit" or "computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

As used herein, the term "user equipment" or "UE" may be synonymous to a mobile station, mobile user, access terminal, mobile terminal, user, subscriber, wireless terminal, terminal and/or remote station and may describe a remote user of wireless resources in a wireless communication network. Accordingly, a user equipment may be a wireless phone, wireless equipped laptop, wireless equipped appliance, etc.

The term "base station" may be understood as a one or more cell sites, base stations, node-Bs, enhanced Node-Bs, access points, and/or any terminus of radio frequency communication. Although current network architectures may consider a distinction between mobile/user devices and access points/cell sites, the example embodiments described hereafter may also generally be applicable to architectures where that distinction is not so clear, such as ad hoc and/or mesh network architectures, for example.

Communication from the base station to the mobile station is typically called downlink or forward link communication. Communication from the mobile station to the base station is typically called uplink or reverse link communication.

Figure 4:
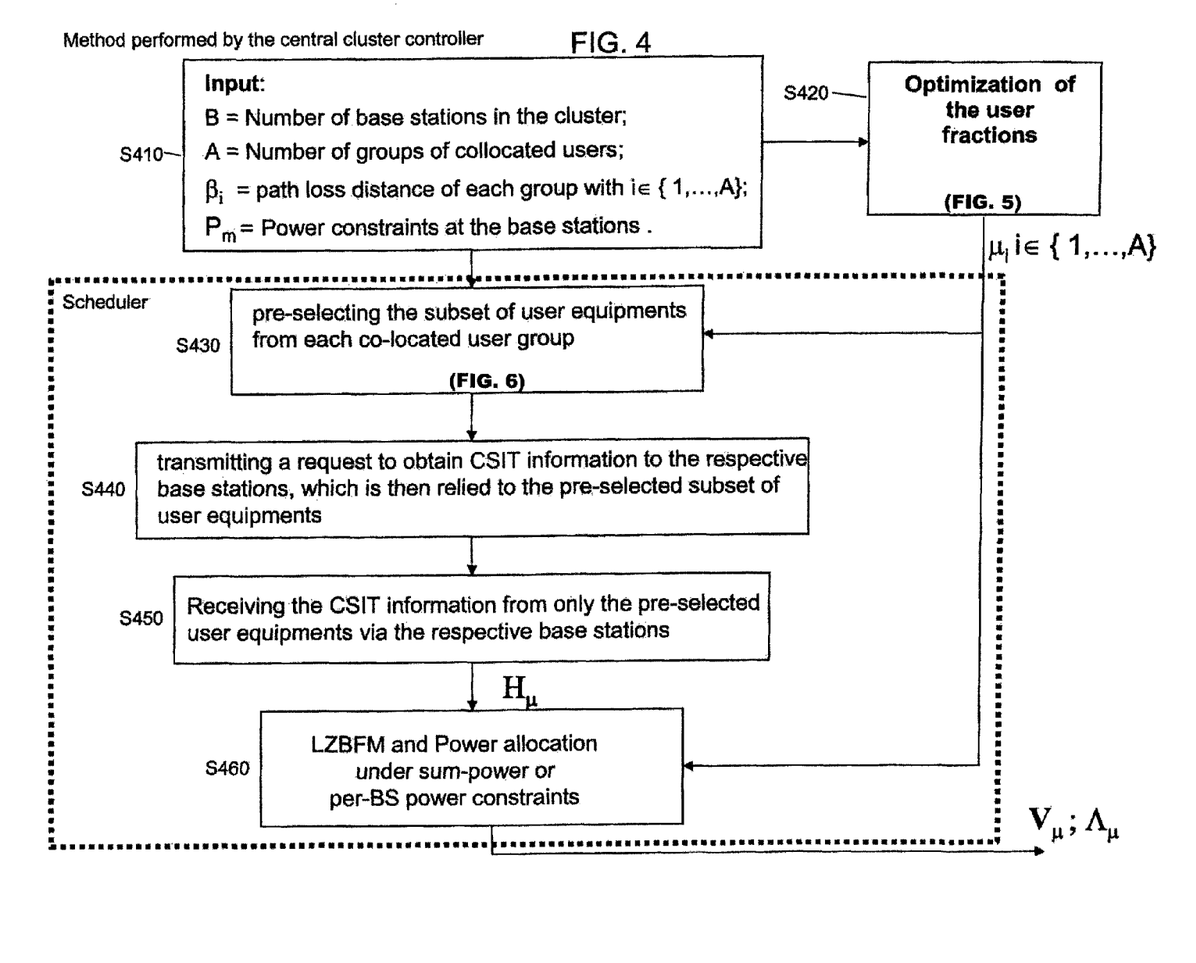
FIG. 4 is a low-complexity method for downlink scheduling performed by a central cluster controller, in accordance with an example embodiment.
Figure 5:
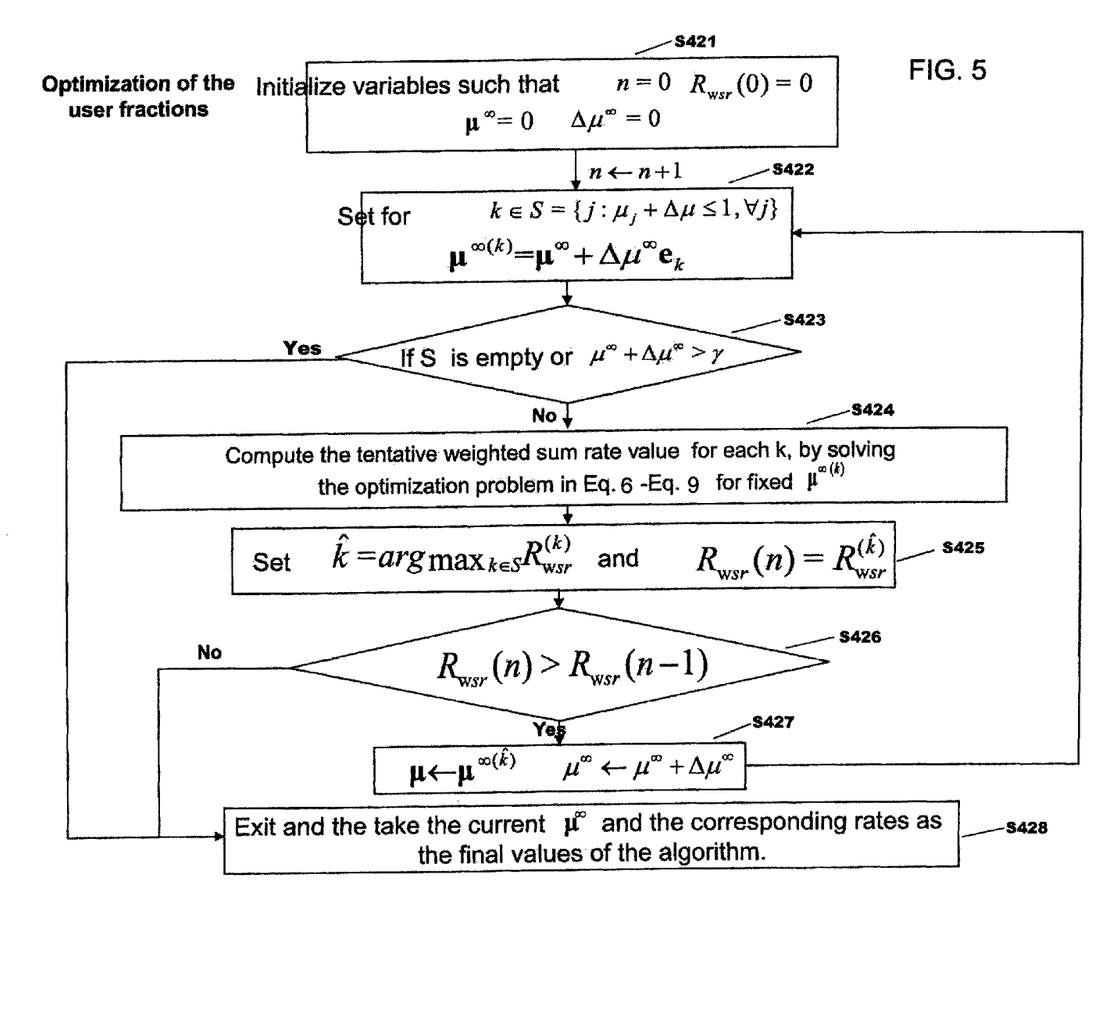
FIG. 5 is a method of optimization of user fractions, as shown in step S420 of FIG. 4, in accordance with an example embodiment.
Figure 6:
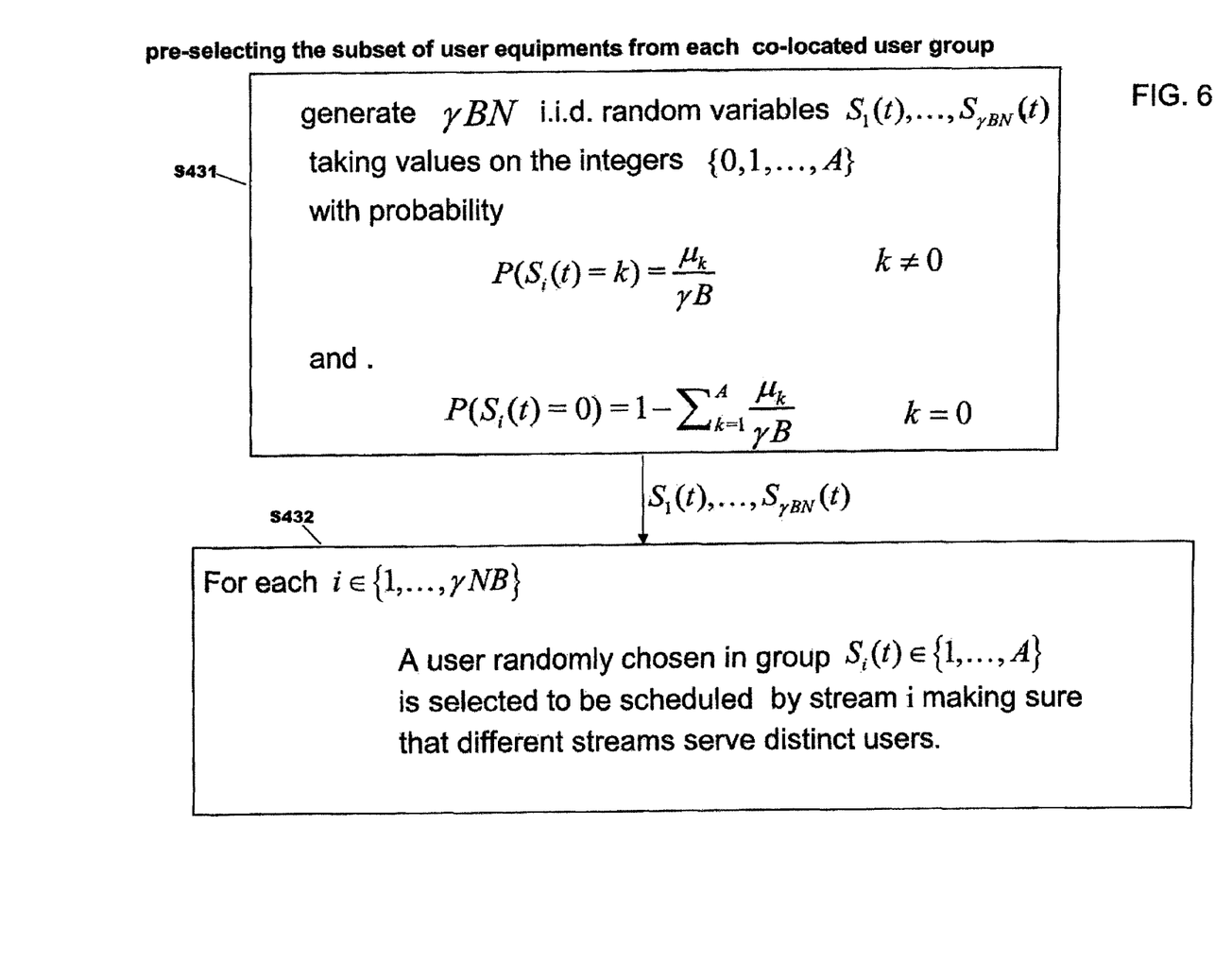
FIG. 6 is a method of pre-selecting the subset of user equipment from collocated user groups, as shown in step S430 of FIG. 4, in accordance with an example embodiment.

FIGS. 4-6 illustrate a low-complexity method for downlink scheduling that greatly reduces the required CSIT feedback, in accordance with an example embodiment. The low-complexity method may be performed by the central cluster controller 120 (see FIG. 1), for each cluster. Starting with FIG. 4, step S410 may include determining a number of base stations 110 in the cluster (signified by "B"). Power constraints ($P_m$) are then determined for each base station, via well-known methods.

Next, a number of groups of collocated users (signified by "A") may be determined. The number of groups of collocated users may be determined via well-known methods, where received channel quality indicator (CQI) reports for all user equipment of the cluster may be used to group users into the collocated user groups. The CQI reports may include carrier level received signal strength indication (RSSI) and bit error rate (BER), allowing path-loss information for each user to be derived. Hence, by using the CQI reports, a determination of the number of collocated users may be determined along with a path loss distance ($\beta_i$) for each of the groups. It is important to note that the CQI report does not include small-scale coefficients (such as Rayleigh fading coefficients), which greatly reduces the amount of overhead that may be required to receive the CQI information (as compared for instance to CSIT reports, which do contain the small-scale coefficients).

As already mentioned FIG. 4-6 illustrate a new low-complexity method for downlink scheduling performed by the central cluster controller 120. This new simplified downlink scheduling scheme preselects the users according to probabilities obtained from the large-system results, depending on the desired fairness criterion. The proposed scheme performs close to the optimal (finite-dimensional) opportunistic user selection while requiring significantly less channel state feedback (such as CSIT information), since only a small fraction of preselected users must feedback channel information, thus allowing significant savings in overhead for channel state feedback as well improving the overall quality of the feedback. The low-complexity method, performed by central scheduling unit (illustrated in FIG. 1 by block 125) is therefore described in more detail by FIG. 4, where the output of the central scheduling unit 125 may be $V_\mu$ (a vector for each selected subset of users) and $\Lambda_\mu$ (a corresponding power to be applied for each subset of users).

Referring to step S420 of FIG. 4, optimal user fractions, $\mu^\infty$, are determined. The user fractions $\mu^\infty$ approximately maximize the desired network utility function. A detailed description of block S420 is given in FIG. 5. The optimization of the user fraction is conventionally a complex problem since it requires the knowledge of all user channels. Furthermore, optimization of the user fraction is a non-convex problem which requires a search over all user subsets of cardinality less or equal to $\gamma BN$.

The method of FIG. 5 overcomes the first difficulty by resorting to a large-system analysis where $N \to \infty$. Using classical random matrix theory results, a novel algorithm (shown in FIG. 5) may perform the asymptotic optimization of the user fractions and provides the asymptotically optimized user fraction $\mu^\infty$. The algorithm is based on the approach of incrementing user fractions $\mu^\infty$ sequentially in very small steps, $\Delta\mu^\infty \ll 1$, until the objective function value cannot be increased any longer. The increment $\Delta\mu^\infty$ is equivalent to greedy user selection in the large system limit (where $\Delta\mu^\infty$ denotes the fraction of one user to the total number of users) which may approach zero. Starting from $\mu^\infty=0$, at each increment k is determined such that incrementing $\mu^\infty_k$ by $\Delta\mu^\infty$ yields the largest improvement, resulting in a finally determined user fraction $\mu^\infty$. Using the tentative configuration of the user fractions $\mu^\infty$, the corresponding power allocation is obtained from a waterfilling solution. The iterative process of FIG. 5 stops when no further increment can improve the objective function value.

To start this process, in step S421 variables are initialized such that n=0, $R_{wsr}(0)=0$, $\mu^\infty=0$, and $\Delta\mu^\infty=0$. The number of users is then incremented, as $n \leftarrow n+1$. As shown in step S422, for $\Delta\mu \ll 1$, set $\mu^{\infty(k)}=\mu^\infty+\Delta\mu^\infty e_k$ (note: $e_k$ denotes a vector of length A of all zeros with a single 1 in position k), for $k \in S=\{j: \mu_j+\Delta\mu \leq 1, \forall j\}$.

In step S423, a determination is made as to whether S is empty or $\mu^\infty+\Delta\mu^\infty > \gamma$. If this determination if affirmative, the method of FIG. 5 terminates as the current user fraction $\mu^\infty$ (with corresponding rates) is determined to be optimized.

In step S423, if the determination is negative, tentative weighted sum rate value $R_{wsr}^{(k)}$ is then determined for each k, by solving, for fixed $\mu^{\infty(k)}=[\mu_1^{\infty(k)}, \ldots, \mu_A^{\infty(k)}]$, using the optimization problem below where this formulation has been obtained using random matrix theory:

$$\text{maximize } R_{wsr}^{(k)} = \sum_{i=1}^{A} W_i \mu_i^{\infty(k)} \log\left(1 + \gamma\left(\sum_{m=1}^{B} \beta_{m,i}^2 \eta_m\right) q_i\right) \tag{6}$$

$$\text{subject to } \sum_{i=1}^{A} \mu_i^{\infty(k)} q_i \leq P_{sum}, \sum_{i=1}^{A} \mu_i^{\infty(k)} \leq \gamma B, \tag{7}$$

$$\eta_m = 1 - \sum_{i=1}^{A} \mu_i^{\infty(k)} \frac{\eta_m \beta_{m,i}^2}{\gamma \sum_{l=1}^{B} \eta_l \beta_{l,i}^2}, m = 1, \ldots, B$$

$$0 \leq \eta_m \leq 1, m = 1, \ldots, B \tag{8}$$

$$q_i \geq 0, 0 \leq \mu_i^{\infty(k)} \leq 1, i = 1, \ldots, A \tag{9}$$

In step S424, optimization algorithms (6)-(9) are solved by: first solving the fixed-point equation (8) in terms of $\eta_m$ m=1, ..., B for fixed $\mu^{\infty(k)}=[\mu_1^{\infty(k)}, \ldots, \mu_A^{\infty(k)}]$ and later using the values to derive $q_i$, i=1, ..., A using the expression shown below:

$$q_i = \left[\frac{W_i}{\lambda} - \frac{1}{\gamma\left(\sum_{m=1}^{B} \beta_{m,i}^2 \eta_m\right)}\right]_+$$

Using this formulation approach, the channel realization disappears. In this way, the problem of prior knowledge of the channel coefficients at the base station is overcome. To solve the per-BS power constraint, the power constraint (in 7) must be replaced by:

$$\sum_{i=1}^{A} q_i \theta_{m,i}(\mu^\infty) \leq P_m, m = 1, \ldots, B \tag{10}$$

where coefficients $\theta_{m,i}(\mu^\infty)$ are provided by the following expression:

$$\theta_{m,k}(\mu^\infty) = \frac{\mu_k \eta_m^2(\mu)(\beta_{m,k}^2 + \xi_{m,k})}{\sum_{l=1}^{B} \eta_l(\mu) \beta_{l,k}^2} \tag{11}$$

where $\xi_m = (\xi_{m,1}, \ldots, \mu_{m,A})^T$ is the solution to the linear system $$[I - \gamma M]\xi_m = \gamma M b_m \tag{12}$$

where M is the A×A matrix:

$$M = \left[\sum_{l=1}^{B} \eta_l^2(\mu) b_l b_l^T\right] \text{diag}\left(\frac{\mu_1}{\Lambda_1^2(\mu)}, \ldots, \frac{\mu_A}{\Lambda_A^2(\mu)}\right) \quad (13)$$

$b_l = (\beta_{l,1}^2, \ldots, \beta_{l,A}^2)^T$, the coefficients $\{\Lambda_k(\mu)\}$ are provided by:

$$\Lambda_k(\mu) = \gamma \sum_{m=1}^{B} \beta_{m,k}^2 \eta_m(\mu)$$

and finally $(\eta_1(\mu), \ldots, \eta_B(\mu))$ is the unique solution in $[0,1]^B$ of the fixed point equation $$\eta_m = 1 - \sum_{q=1}^{A} \mu_q \frac{\eta_m \beta_{m,q}^2}{\gamma \sum_{l=1}^{B} \eta_l \beta_{l,q}^2}, \; m = 1, \ldots, B \quad (14)$$

with respect to the variables $\eta = \{\eta_m\}$

Equation (11) is proved by Theorem 2, provided at the end of this document.

It should be understood however that the problem is still generally non-convex in q,$\mu^\infty$ and $\eta$. However, for fixed $\eta$ and $\mu^\infty$, the problem is convex in q, and the solution is given by water-filling, as shown below:

$$q_k = \left[\frac{W_k}{\lambda} - \frac{1}{\gamma\left(\sum_{m=1}^{B} \beta_{m,k}^2 \eta_m\right)}\right]_+$$

Near-optimal solutions, can be found by borrowing from the greedy user selection heuristic used in the finite-dimensional case (see Equation (6) above, and Equation (26) listed below).

In step S425, let $\hat{k} = \text{argmax}_{k \in S} R_{wsr}^{(k)}$ and set $R_{wsr}(n) = R_{wsr}^{(\hat{k})}$. In step S426, a determination is made as to whether $R_{wsr}(n) > R_{wsr}(n-1)$. If the determination is affirmative, then in step S427 the user fractions are incrementally increased ($\mu^\infty \leftarrow \mu^{\infty(\hat{k})}$, $\mu \leftarrow \mu + \Delta\mu$) before the iterative process returns to step S422. If however, the determination is negative, then in step S428 the current user fraction $\mu^\infty$ (with the corresponding rates) is determined to be the optimized user fraction determined by the method of FIG. 5.

Referring back to FIG. 4, the input parameters from step S410 and the determined user fraction $\mu^\infty$ (step S420, determined via from FIG. 4) is used as an input into step S430. Specifically, step S430 implements the proposed probabilistic scheduling, described herein and shown in detail in FIG. 6. Specifically, as shown in FIG. 6, the users to which CSIT feedback is requested are randomly selected in each slot t based on the asymptotic optimal pre-scheduled user fractions per group of (approximately) co-located users $\{\mu^\infty_k\}$, obtained from the algorithm described in step S460 of FIG. 4. As shown in step S431 of FIG. 6, a cluster controller 120 has a maximum of $\gamma BN$ independent data streams to transmit using LZBF (equal to the number of jointly coordinated transmit antennas). At each time t, the scheduler generates $\gamma BN$ independently and identically distributed random variables $S_1(t), \ldots, S_{\gamma BN}(t)$, taking values on the integers $\{0, 1, \ldots, A\}$ with probability $$P(S_i(t) = k) = \frac{\mu_k}{\gamma B} \text{ for } k \neq 0 \text{ and } P(S_i(t) = 0) = 1 - \sum_{k=1}^{A} \frac{\mu_k}{\gamma B}.$$

Then, user group k is served by stream i at time slot t if $S_i(t) = k$. Notice that the stream i's for which $S_i(t) = 0$ are not used, and multiple streams may be associated to a same user group.

Finally, in step S432, after the allocation of streams to users is determined, only the selected users are requested to feedback their CSIT and the scheduler optimizes the transmit powers by solving the weighted sum rate maximization problem with weights $W_k = \partial g(\overline{R})/\partial \overline{R}_k$, corresponding to the optimal asymptotic throughput point. In the special case of PF scheduling, this is given by $W_k = 1/\overline{R}_k$.

Referring back to FIG. 4, in step S440 a request to obtain CSIT information from the set of users preselected for being scheduled (determined from step S430, shown in FIG. 6) is accomplished.

In step S450, the scheduler receives the CSIT information from only the pre-selected user equipment via the respective base stations.

In step S460, based on: 1) the CSIT being fed back by the selected users 145 and received by the scheduler 125 (see step S450), and 2) $\mu^\infty = (\mu_1, \ldots, \mu_k)$ (i.e. the fractions of active users in groups $1, \ldots, A$, respectively, which is the output of step S420), the central scheduling unit 125 may:

Obtain the LZFB precoder by normalizing the columns of the Moore-Penrose pseudo-inverse of the channel matrix, as illustrated in Equations (17)-(19), although this choice is not necessarily optimal under the per-BS power constraint (described in equation (25), below).

Optimize the transmit powers, for the selected users, by solving the weighted sum rate maximization problem with weights $W_k = \partial g(\overline{R})/\partial \overline{R}_k$, corresponding to the optimal asymptotic throughput point, as described by Eq. (20)-(29). In the special case of PF scheduling, this is given by $W_k = 1/\overline{R}_k$.

As already mentioned in step S460, the central scheduling unit receives as input $\mu^\infty = (\mu_1, \ldots, \mu_k)$, and the corresponding effective channel matrix $H_\mu$ given by:

$$H_\mu = \begin{bmatrix} \beta_{1,1} H_{1,1}(\mu_1) & \cdots & \beta_{1,A} H_{1,A}(\mu_A) \\ \vdots & & \vdots \\ \beta_{B,1} H_{B,1}(\mu_1) & \cdots & \beta_{B,A} H_{B,A}(\mu_A) \end{bmatrix},$$

The blocks $H_{m,k}(\mu_k)$ are a $\gamma N \times \mu_k N$ dimensional submatrix of $H_{m,k}$. The user fractions must satisfy $\mu_k \in [0,1]$ for each k = $1, \ldots, A$, and $$\mu \triangleq \sum_{k=1}^{A} \mu_k \leq \gamma B.$$

Hence, rank($H_\mu$)=$\mu N$ is almost surely satisfied. For later use, the below notation is introduced:

$$\mu_1^k = \sum_{j=1}^{k} \mu_j \quad (15)$$

The LZFB precoding scheme yields the transmitted signal for active users, $x_\mu$ in the following form:

$$x_\mu = V_\mu Q^{1/2} u \quad (16)$$

It should be understood that u is the independently coded unit-power user symbol vector of length $\mu N$, $V_\mu$ is the precoding matrix with unit-norm columns and Q is the diagonal matrix which contains user powers on the diagonal. In particular, here we assume that $V_\mu$ is obtained from the Moore-Penrose pseudo-inverse as follows: define the pseudo-inverse of $H_\mu^H$ as:

$$H_\mu^+ = H_\mu (H_\mu^H H_\mu)^{-1}, \quad (17)$$

Therefore, $$V_\mu = H_\mu^+ \Lambda_\mu^{1/2}, \quad (18)$$

where the column-normalizing diagonal matrix $\Lambda_\mu$ contains the reciprocal of the squared norm of columns of $H_\mu^+$ on the diagonal. Letting $\Lambda_k^{(i)}$ denote the diagonal element of $\Lambda_\mu$ in position $\mu_1^{k-1} N + i$, for $i = 1, \ldots, \mu_k N$, such that $$\Lambda_k^{(i)}(\mu) = \frac{1}{[(H_\mu^H H_\mu)^{-1}]_k^{(i)}} \quad (19)$$

Where $[(H_\mu^H H_\mu)^{-1}]_k^{(i)}$ denotes the element in the corresponding position $\mu_1^{k-1} N + i$ of the main diagonal of the matrix $(H_\mu^H H_\mu)^{-1}$.

Herein, we describe the solution to power optimization problem given in equation (12) under the two different constraints: "P1: sum-power constraint" and "P2: per-BS power constraint". Let $q_k^{(i)}$ denote the diagonal element in position $\mu_1^{k-1} N + i$ of Q, corresponding to the power allocated to the i-th user of group k. Under the above assumptions and notations, for fixed user fractions $\mu_k, k = 1, \ldots, A$, the power optimization problem is given by the $$\max_{\{q_k^{(i)}\},\mu} \sum_{k=1}^{A} \sum_{i=1}^{\mu_k N} W_k^{(i)} \log(1 + \Lambda_k^{(i)}(\mu) q_k^{(i)}) \quad (20)$$

subject to:
P1—the case of sum-power constraint $$\frac{1}{N} tr(Q) = \frac{1}{N} \sum_{k=1}^{A} \sum_{i=1}^{\mu_k N} q_k^{(i)} \leq P_{sum} = \sum_{m=1}^{B} P_m \quad (21)$$

P2—in the case of per-BS power constraint $$\frac{1}{N} tr(\Phi_m V_\mu Q V_\mu^H) \leq P_m, m = 1, \ldots, B \quad (22)$$

More explicitly, the per-BS power constraint given in (22) can be written in terms of the powers $q_k^{(i)}$ as:

$$\frac{1}{N} tr(\Phi_m V_\mu Q V_\mu^H) = \sum_{k=1}^{A} \sum_{i=1}^{\mu_k N} q_k^{(i)} \theta_{m,k}^{(i)} \leq P_m, m = 1, \ldots, B \quad (23)$$

where we define the coefficients $$\theta_{m,k}^{(i)}(\mu) = \frac{1}{N} \sum_{l=(m-1)\gamma N + 1}^{m\gamma N} |[V_\mu]_{l,k}^{(i)}|^2 \quad (24)$$

Where $[V_\mu]_{l,k}^{(i)}$ denotes the element of $V_\mu$ corresponding to the l-th row and the $\mu_1^{k-1} N + i$ column. Since $V_\mu$ has unit-norm columns, then $\Sigma_{m=1}^{B} \theta_{m,k}^{(t)}$ for all k,i.

The solution of (20) is subject to the sum-power constraint, given by the water-filling formula:

$$q_k^{(i)} = \left[ \frac{W_k^{(i)}}{\lambda} - \frac{1}{\Lambda_k^{(i)}(\mu)} \right]_+ \quad (25)$$

Where $\lambda \geq 0$ is the Lagrange multiplier corresponding to the sum-power constraint.

In the case of per-BS power constraint, we can use Lagrange duality and sub-gradient iteration method as given in the following. The Lagrangian for (16) is given by (dependency on $\mu$ is dropped for notation simplicity):

$$L(q, \lambda) = \sum_{k=1}^{A} \sum_{i=1}^{\mu_k N} W_k^{(i)} \log(1 + \Lambda_k^{(i)} q_k^{(i)}) - \lambda^T [\Theta q - P] \quad (26)$$

Where $\lambda \geq 0$ is a vector of dual variables corresponding to the m per-BS power constraints, $\Theta$ is the B×$\mu N$ matrix containing the coefficients $\theta_{m,k}^{(i)}$ and $P = (P_1, \ldots, P_B)^T$. The KKT conditions are given by:

$$\frac{\partial L}{\partial q_k^{(i)}} = W_k^{(i)} \frac{\Lambda_k^{(i)}}{1 + \Lambda_k^{(i)} q_k^{(i)}} - \lambda^T \theta_k^{(i)} \leq 0 \quad (27)$$

Where $\theta_k^{(i)}$ is the column of $\Theta$ containing the coefficients $\theta_{m,k}^{(i)}$ for $m = 1, \ldots, B$. Solving for $q_k^{(i)}$ is accomplished by:

$$q_k^{(i)}(\lambda) = \left[ \frac{W_k^{(i)}}{\lambda^T \theta_k^{(i)}} - \frac{1}{\Lambda_k^{(i)}} \right]_+ \quad (28)$$

Replacing this solution into $L(q,\lambda)$, the dual problem is solved by minimizing $L(q(\lambda), \lambda)$ with respect to $\lambda \geq 0$. It is then imperative to check that for any $\lambda' \geq 0$, as shown:

$$L(q(\lambda'),\lambda') \geq L(q(\lambda),\lambda') = (\lambda' - \lambda)^T (P - \Theta q(\lambda)) + L(q(\lambda),\lambda) \quad (29)$$

Therefore, $(P - \Theta q(\lambda))$ is a subgradient for $L(q(\lambda)v)$. It follows that the dual problem can be solved by a simple B-dimensional subgradient iteration over the vector of dual variables $\lambda$.

Theorem 2 (proving Equation (11) used in step S424 of FIG. 5, described above): For all m, k, the following limit holds almost surely:

$$\lim_{N \to \infty} \theta_{m,k}(\mu) = \frac{\mu_k \eta_m^2(\mu)(\beta_{m,k}^2 + \xi_{m,k})}{\sum_{l=1}^{B} \eta_l(\mu)\beta_{l,k}^2} \quad (30)$$

where $\xi_m = (\xi_{m,1}, \ldots, \xi_{m,A})^T$ is the solution to the linear system $$[I - \gamma M]\xi_m = \gamma M b_m \quad (31)$$

where M is the A×A matrix $$M = \left[\sum_{l=1}^{B} \eta_l^2(\mu) b_l b_l^T\right] \text{diag}\left(\frac{\mu_1}{\Lambda_1^2(\mu)}, \ldots, \frac{\mu_A}{\Lambda_A^2(\mu)}\right) \quad (32)$$

$b_l = (\beta_{l,1}^2, \ldots, \beta_{l,A}^2)^T$, the coefficients $\{\Lambda_k(\mu)\}$ are provided by $$\Lambda_k(\mu) = \gamma \sum_{m=1}^{B} \beta_{m,k}^2 \eta_m(\mu)$$

and finally $(\eta_1(\mu), \ldots, \eta_B(\mu))$ is the unique solution in $[0,1]^B$ of the fixed point equation $$\eta_m = 1 - \sum_{q=1}^{A} \mu_q \frac{\eta_m \beta_{m,q}^2}{\gamma \sum_{l=1}^{B} \eta_l \beta_{l,q}^2}, \; m = 1, \ldots, B \quad (33)$$

with respect to the variables $\eta = \{\eta_m\}$

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. A system for downlink scheduling, the system comprising:
    a central controller configured to control downlink scheduling for a cluster of one or more base stations serving user groups, each user group including a plurality of co-located user equipments,
    the central controller configured to pre-select a number value of user equipments for each respective user group, without first receiving channel state information from the co-located user equipments of the user groups,
    the pre-selection being based on at least one parameter, wherein the central controller is further configured to select specific user equipments from each user group, a number of specific user equipments being selected from each user group being equal to the pre-selected number value associated with a particular user group.

2. The system of claim 1, wherein the central controller is further configured to receive channel state information from only the selected specific user equipments.

3. The system of claim 2, wherein the channel state information includes a Channel State Information at the Transmitter (CSIT) report.

4. The system of claim 3, wherein the CSIT report includes large-scale coefficients and small-scale coefficients, the large-scale coefficients being path-loss coefficients and the small-scale coefficients being Rayleigh fading coefficients.

5. The system of claim 2, wherein the central controller is further configured to,
    determine a linear zero-forcing beamforming scheme based on the received channel state information, and
    schedule downlink transmissions based on the linear zero-forcing beamforming scheme.

6. The system of claim 1, wherein the at least one parameter includes path loss distance information obtained from channel quality indicator (CQI) reports received from the plurality of co-located user equipments from each user group.

7. The system of claim 6, wherein the CQI reports include carrier level received signal strength indication (RSSI) information and bit error rate (BER) information, the CQI reports not including small-scale coefficient information.

8. The system of claim 1, wherein,
    the at least one parameter includes a number of base stations in the cluster, a number of user groups in the cluster, path loss distance information for each of the plurality of co-located user equipments of each user group, and power constraint information at each of the base stations,
    the at least one parameter not including small-scale coefficient information.

9. The system of claim 1, wherein the central controller is further configured to,
    determine user groups using received channel quality indicator (CQI) reports from the plurality of user equipments of each user group to ensure that user equipments of respective user groups are co-located.

10. A method for downlink scheduling, the system comprising:
    controlling, by a central controller, downlink scheduling for a cluster of one or more base stations serving user groups, each user group including a plurality of co-located user equipments, the controlling step including,
        pre-selecting a number value of user equipments for each respective user group, without first receiving channel state information from the co-located user equipments of the user groups,
    the pre-selection being based on at least one parameter wherein the controlling step further includes,
        selecting specific user equipments from each user group, a number of specific user equipments being selected from each user group being equal to the pre-selected number value associated with a particular user group.

11. The method of claim 10, wherein the controlling step further includes,
    receiving, by the central controller, channel state information from only the selected specific user equipments.

12. The method of claim 11, wherein the channel state information includes a Channel State Information at the Transmitter (CSIT) report.

13. The method of claim 12, wherein the CSIT report includes large-scale coefficients and small-scale coefficients, the large-scale coefficients being path-loss coefficients and the small-scale coefficients being Rayleigh fading coefficients.

14. The method of claim 10, wherein the controlling step further includes determining a linear zero-forcing beamforming scheme based on the received channel state information, the method further comprising:

scheduling downlink transmissions based on the linear zero-forcing beamforming scheme.

15. The method of claim 10, wherein the at least one parameter includes path loss distance information obtained from channel quality indicator (CQI) reports received from the plurality of co-located user equipments from each user group.

16. The method of claim 15, wherein the CQI reports include carrier level received signal strength indication (RSSI) information and bit error rate (BER) information, the CQI reports not including small-scale coefficient information.

17. The method of claim 10, wherein,
the at least one parameter includes a number of base stations in the cluster, a number of user groups in the cluster, path loss distance information for each of the plurality of co-located user equipments of each user group, and power constraint information at each of the base stations,
the at least one parameter does not include small-scale coefficient information.

18. The method of claim 10, wherein the controlling step further includes,
determining user groups using received channel quality indicator (CQI) reports from the plurality of user equipments of each user group to ensure that user equipments of respective user groups are co-located.

* * * * *